United States Patent
Poltavtsev (10) Patent No.: US 11,258,175 B2
(45) Date of Patent: Feb. 22, 2022

(54) SMART WEARABLE DEVICE

(71) Applicant: SMARTLINE B.V., Amsterdam (NL)

(72) Inventor: Dmytro Borysovytch Poltavtsev, Amsterdam (NL)

(73) Assignee: SMARTLINE B.V., Amsterdam (NL)

( * ) Notice: Subject to any disclaimer, the term of this patent is extended or adjusted under 35 U.S.C. 154(b) by 24 days.

(21) Appl. No.: 16/960,144

(22) PCT Filed: Jan. 7, 2019

(86) PCT No.: PCT/NL2019/050007
§ 371 (c)(1),
(2) Date: Jul. 6, 2020

(87) PCT Pub. No.: WO2019/135680
PCT Pub. Date: Jul. 11, 2019

(65) Prior Publication Data
US 2021/0126371 A1    Apr. 29, 2021

(30) Foreign Application Priority Data
Jan. 5, 2018  (NL) ..................................... 2020241

(51) Int. Cl.
*H01Q 3/44* (2006.01)
*H01Q 9/04* (2006.01)
(Continued)

(52) U.S. Cl.
CPC .......... *H01Q 9/0421* (2013.01); *H01Q 1/273* (2013.01); *H04B 1/385* (2013.01); *H01Q 1/243* (2013.01);
(Continued)

(58) Field of Classification Search
CPC ...... H01Q 9/0421; H01Q 1/273; H01Q 1/528; H01Q 9/04; H01Q 9/16; H01Q 1/243; H04B 1/385
See application file for complete search history.

(56) References Cited

U.S. PATENT DOCUMENTS 6,005,525 A     12/1999  Kivela
2003/0169207 A1  9/2003  Beigel
(Continued)

OTHER PUBLICATIONS

International Preliminary Report on Patentability corresponding to International Application No. PCT/NL 2019/050007 dated Jul. 7, 2019.
(Continued)

*Primary Examiner* — Joseph J Lauture
(74) *Attorney, Agent, or Firm* — Jenkins, Wilson, Taylor & Hunt, P.A.

(57) ABSTRACT

A wearable device comprises wireless communication means and a patch antenna that is coupled to said wireless communication means to receive and/or transmit electromagnetic radiation. Said patch antenna comprises a planar patch conductor and a planar ground conductor that are separated by a dielectric in between said patch conductor and said ground conductor while at least partially overlapping with one another. The device comprises a core inside a shell and comprises at least part of said communication means within said core. Said shell comprises a first shell part and a second shell part opposite said first shell part, wherein said first shell part and said second shell part are at least partially separated by said dielectric. Said first shell part comprises said patch conductor and said second shell part comprises said ground conductor. Said first shell part and said second shell part together form said patch antenna. The wearable device particularly is a piece of jewellery.

20 Claims, 4 Drawing Sheets

(51) Int. Cl.
    *H01Q 1/27*      (2006.01)
    *H04B 1/3827*    (2015.01)
    *H01Q 1/24*      (2006.01)
    *H01Q 9/16*      (2006.01)
    *H01Q 1/52*      (2006.01)

(52) U.S. Cl.
    CPC .............. *H01Q 1/528* (2013.01); *H01Q 9/04* (2013.01); *H01Q 9/16* (2013.01)

(56) References Cited

U.S. PATENT DOCUMENTS

| | | |
|---|---|---|
| 2004/0145975 A1 | 7/2004 | Barras |
| 2014/0354494 A1* | 12/2014 | Katz ....................... H01Q 9/42 343/718 |
| 2015/0048979 A1 | 2/2015 | Asrani et al. |
| 2015/0357717 A1 | 12/2015 | Petted |
| 2016/0056533 A1 | 2/2016 | Nissinen et al. |

OTHER PUBLICATIONS

International Search Report corresponding to International Application No. PCT/NL 2019/050007 dated May 31, 2019.

Written Opinion of the International Searching Authority corresponding to International Application No. PCT/NL 2019/050007 dated May 31, 2019.

* cited by examiner

SMART WEARABLE DEVICE

CROSS REFERENCE TO RELATED APPLICATIONS

This application is a national stage filing of PCT International Application No. PCT/NL2019/050007, filed Jan. 7, 2019, which is based on and claims priority to Netherlands Patent Application No. 2020241, filed Jan. 5, 2018.

FIELD OF THE INVENTION

The present invention relates to a wearable device, comprising a structure that is configured to be worn by a user, said structure having a first exposed surface and a second exposed surface, said second surface being located closer to the user than said first surface when the structure is being worn by the user, said structure comprising wireless communication means and comprising a patch antenna that is coupled to said wireless communication means to receive and/or transmit electromagnetic radiation, wherein said patch antenna comprises a substantially planar patch conductor and a substantially planar ground conductor that are separated by a dielectric in between said patch conductor and said ground conductor while at least partially overlapping with one another laterally, and wherein said structure comprises a core within a shell, said core comprising at least part of said communication means.

BACKGROUND

Microstrip patch antennas are known to be used in various devices and articles such as smart wearable devices. As such they have been used in smart watches for wireless communication. Such antennas typically consist of a patch conductor (often rectangular in shape) placed above a conducting surface (ground conductor) and are generally, but not necessarily, made by printed-circuit techniques. They normally have planar conductors, and are therefore often referred to as planar antennas. Most commonly such antennas are placed as a module inside the protective enclosure made of dielectric.

In the basic form, the patch and the ground form a half-wave resonator and the major radiation is upwards, away from the ground. Patch antennas may be fed in various ways, including by a pin that is a protrusion of a coaxial line, whose outer conductor is terminated in the ground. The position of the feed is determined in order to match the antenna to the feeder. For design purposes, once the substrate has been selected, a rectangular patch antenna is defined by only two dimensions: the length and the width. The length primarily defines the resonant frequency and, hence, the operating frequency. The width influences the antenna bandwidth. However, due to the small distance between the patch conductor and the ground conductor, microstrip patch antennas are inherently narrowband. In order to improve the bandwidth, it is desirable to increase this distance. A compact form of the microstrip patch antenna is obtained by short-circuiting one end of the patch to the ground, thus forming a quarter-wavelength resonator. This antenna is also known as the planar inverted-F antenna (PIFA).

Traditionally, an internal antenna (e.g. a PIFA, a loop, or a chip antenna) is hidden under a large piece of plastic or other dielectric material of the wearable device. The antenna, being installed inside the body of the wearable device, radiates through the dielectric material covering it. In such devices a large metal-free zone is required at least on the top surface of enclosure and in some cases on the bottom of the device. Alternatively, the antenna may be exposed by creating dielectric gaps in the top part of a metallic shell body. This approach, however, limits aesthetic design options and device would not be considered a jewel as it wouldn't have metallic look and feel. In addition, such design may reduce the performance of antenna, resulting in a reduced range, narrow band, and/or a lossy antenna.

Thus, there is a need to devise a wearable device with a microstrip patch antenna that mitigates the aforesaid drawbacks related to aesthetics and performance of the antenna.

SUMMARY OF THE INVENTION

In order to achieve said object of the invention, a wearable device of the type as described in the opening paragraph, according to the present invention, is characterized in that said outer shell comprises a first shell part that defines a first circumference of the device and comprises said first surface, in that said outer shell comprises a second shell part that defines a second circumference of the device and comprises said second surface, in that said first shell part and said second shell part are formed at least substantially of metal and are at least partially separated from one another by said dielectric, in that said first shell part forms said patch conductor at said first exposed surface, in that said second shell part forms said ground conductor at said second exposed surface, and in that said first shell part and said second shell part together form said patch antenna. Hence, according to the invention, the metallic shell parts of the wearable device that are exposed to the external environment do not require any additional enclosure or insulation around them and are essentially used as active components of the antenna. This provides a relatively large or even maximum radiating surface area of the patch that, together with required dielectric separation between patch and ground conductors, defines the operating bandwidth and efficiency of the device.

It is hereby noticed that within the scope of the present application the expression "metal" has to be understood as being formed at least substantially of one or more pure (elementary) metals, one or more metal alloys, a combination of one or metals and metal alloys or, at least, as having metallic properties. In this respect the present invention particularly aims at providing a wearable device as a piece of jewellery in which case said metals will comprise one or more precious (noble) metals with or without the addition of one or more gem stones or the like. The invention, hence, is particularly favourable for aesthetically embedding smart electronics, including wireless communication, in a piece of jewellery.

The invention solves the aesthetical and performance problems of the known antenna in a metal shell by maximizing the metal surface of the top of the piece of jewel by essentially converting the top metal surface of this jewel into compact patch microstrip (PIFA) antenna that is directly exposed to the environment. The performance of this antenna is practically as good as can be theoretically achieved from the given overall sizes of the structure that particularly constitutes a piece of jewel. This includes the operating bandwidth in which the antenna is well matched to its feeder and provides a stable radiation pattern combined with a high efficiency. Since there is no requirement for an insulation or other protective enclosure covering the metal shell parts, the invention allows more freedom of the design of the jewel's metal surface, which makes the smart jewel more attractive, by enabling a precious-metal and jewellery look and feel. The design also yields more possibilities for the placement of components inside the jewel because there is no need for clearance zones on a printed-circuit board (PCB), in contrast to the requirements imposed, for example, by conventional chip antennas which, essentially, make the PCB behave as a crucial part of the antenna. The patch conductor may be mechanically stabilized by a dielectric support, which is visible from outside the jewel, but which is seamlessly incorporated into the aesthetic design of the jewel.

A particular embodiment of the wearable device according to the invention is characterized in that said first shell part comprises an exposed top metallic surface of said device and said second shell part comprises a bottom metallic surface of said device at a side that is opposite to said top surface. In this manner the extreme position of the front and rear surfaces of the device are used to provide maximum dimensions to their antenna function. This is particularly exploited in a further specific embodiment of the device according to the invention that is characterized in that a width of said patch conductor is substantially equal to a width of said wearable device, and more particularly in that said patch conductor and said ground conductor are shaped according to the respective contour of said structure.

For a proper functioning, the patch conductor should be connected reliably to the communication means, that may reside on a printed-circuit board inside the core of the device. For that purpose a further particular embodiment of the device according to the invention is characterized in that said communication means comprises at least one feeder spring inside said core that is configured to connect said patch conductor to said communication means.

A compact microstrip patch antenna can be achieved by grounding the patch conductor at one end, such that the patch conductor and the ground conductor form a quarter-wave resonator at the operating frequency, thus reducing the size of the antenna. To this end, a further embodiment of the device according to the invention is characterized in that said core comprises at least one shortening spring or pin or other electromechanical connector that is configured to connect said patch conductor to said ground conductor. In a further embodiment, shortening spring(s) are connected to printed-circuit board (PCB) acting as ground layer, which in turn is connected to the bottom metal shell part of the device acting as a ground conductor.

In this respect, a further specific embodiment of the device according to the invention is characterized in that a length of said patch conductor is shorter than a quarter-wavelength at a central frequency of the operating band of said antenna and a width of said patch conductor is same as the width of said wearable device.

A particularly practical embodiment of the device according to the invention is characterized in that the resonant frequency of said patch antenna is determined by a length of said patch conductor and a position of said at least one feeder spring and of said at least one shorting spring. In a further particular embodiment, the device according to the invention is thereby characterized in that said patch antenna is configured to cover more than one frequency band.

In a further preferred embodiment the device according to the invention is characterized in that said dielectric is part of a dielectric member having a first portion that lies in between the first top metallic shell part and the second bottom metallic shell part and having a second portion that laterally is adjacent to a tip end of the patch conductor and emerges at an exposed metallic surface of the first shell part.

Said second dielectric portion separates the patch conductor from a remaining portion of the top metallic surface. Said dielectric member may be configured to support the patch conductor and first shell part at a first side while being attached to the second bottom shell part which acts as a ground conductor on an opposite side. Said second portion of dielectric delimits the patch conductor and hence its position influences the length of the patch antenna. Since the shape of the patch conductor, as well as of the ground conductor, follow and define the contours of a jewel, such as a bracelet, it usually has a U-shaped cross section. The resulting antenna may equally be referred to as a U-shaped exposed patch antenna.

The top patch conductor of the exposed antenna, the bottom ground conductor, and the dielectric (insulation) between the top and the bottom of the device are adjusted to balance the desired aesthetics and a good performance. The antenna may be tuned by repositioning of grounding springs and a feeder spring inside the smart jewel. To that end, a further specific embodiment of the device according to the invention is characterized in that at least one of said at least one feeder spring and at least one shorting spring is adjustable, particularly displaceable, for fine tuning of said patch antenna. Alternatively, or additionally, a further specific embodiment of the device according to the invention is characterized in that said patch antenna is tuned by an electronic circuitry arrangement.

Since the patch conductor is exposed to a direct contact with outside environment (air, moisture, contact with human body or other objects) and is prone to electrostatic discharges, any electronic circuitry that is part of the communication means is preferably protected against such discharge. To that end, a further specific embodiment of the device according to the invention is characterized in that said communication means are protected by at least one transient-voltage suppressor diode, or a similar component, between said patch conductor and said communication means.

The wearable device according to the invention particularly constitutes a piece of smart jewellery that has an uncompromised appearance as a jewel but, nonetheless, includes sophisticated smart electronics inside its core that provide feedback to the user and allow wireless communication with an external device, like a user's smart phone or computer. Said electronics includes at least one electronic component within said core configured for wireless communication and particularly comprises a printed-circuit board (PCB) including a plurality of electronic components configured for wireless communication. Further, to provide feedback to the wearer, a further specific embodiment of the device according to the invention is characterized in that said shell features one or more human recognizable indicator means, particularly one or more light emitting diodes (LEDs) and/or vibrating means, like a vibro motor. The built-in electronics may perform various functions, like wirelessly receive data from external devices, collect data through embedded sensors, process data, wirelessly transmit data to external devices like a mobile phone or other device, serve as an interface to the end-user (wearer) by including one or more of LEDs, a vibro motor, hardware buttons and the like to provide a user-friendly user interface.

In order to add to the look and feel of the device as a jewel, while providing improved antenna functionality, such wearable device according to the invention is characterized in that said first and said second shell part constitute said patch conductor and said ground conductor respectively and are made of metal, particularly of at least one precious metal, and more particularly of at least one noble metal. To further give the device a more luxurious appearance, a further embodiment thereof is characterized in that at least said first shell part is set with at least one jewel from a group containing crystals, semi-precious stones and gemstones, and/or ceramic or other decorative inserts.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF DRAWINGS

The accompanying drawings constitute a part of the description and are used to provide a further understanding of the present invention.

DETAILED DESCRIPTION

Example embodiments will now be described more fully with reference to the accompanying drawings.

Figure 1:
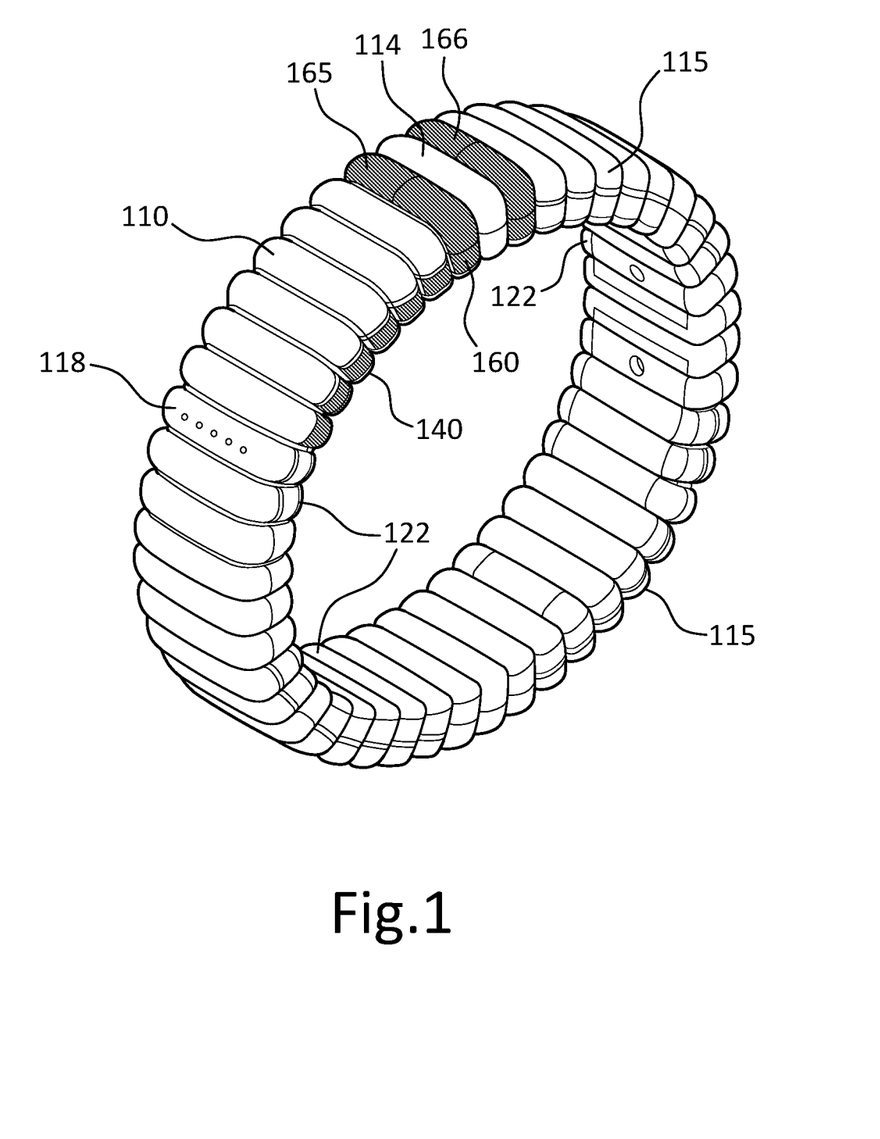
FIG. 1 illustrates a perspective view of a device according to the invention, incorporating a compact patch antenna and its elements.

FIG. 1 illustrates a perspective view of a device according to an embodiment of the present invention. The device basically consists of a structure that is configured and shaped to be worn by a user. In an embodiment, this structure is a wearable device such as smart jewellery and, for example, forms a bracelet, flat connected pendants, ring, necklace and the like, capable of being used for wireless communication. The device may include both metal and non-metal components. The surface may have any 3-D design/pattern such as a zigzag pattern, wave like-design and the like. In one embodiment, the device includes an exposed (first) top surface 118 and an exposed (second) bottom surface 122, such that the top surface 118 includes a patch conductor 110 and the bottom surface 122 includes a ground conductor 140. The device further comprises a hollow core formed between the top surface 118 and the bottom surface 122.

The material of the patch conductor 110 can be brass, gold, silver, or any other precious and non-precious metal or a combination of metals. Electroplated coating or other type of metal-on-metal coating is possible with other metals (e.g., rhodium, gold, etc.) as long as the resulting metal combination/alloy remains conductive. The material of the other metallic parts of the bracelet shell, which may be connected to the ground conductor or the patch conductor by various manufacturing techniques, like stamping/fusing/casting, soldering, etc., can also be brass, gold, silver, or any other precious and non-precious metal or a combination of metals. Electroplated coating or other type of metal-on-metal coating is possible with other metals (e.g., rhodium, gold, etc.). The possibility to use various metal combinations for the patch conductor 110, the ground conductor 140, and the other parts of the smart/connected jewels is a huge advantage for the jewellery design as it allows to vary the design without changing the dimensions or the 3D shape of the bracelet, thus achieving a greater variety in design with the same 3D model and in many cases also a similar production technique.

Figure 2:
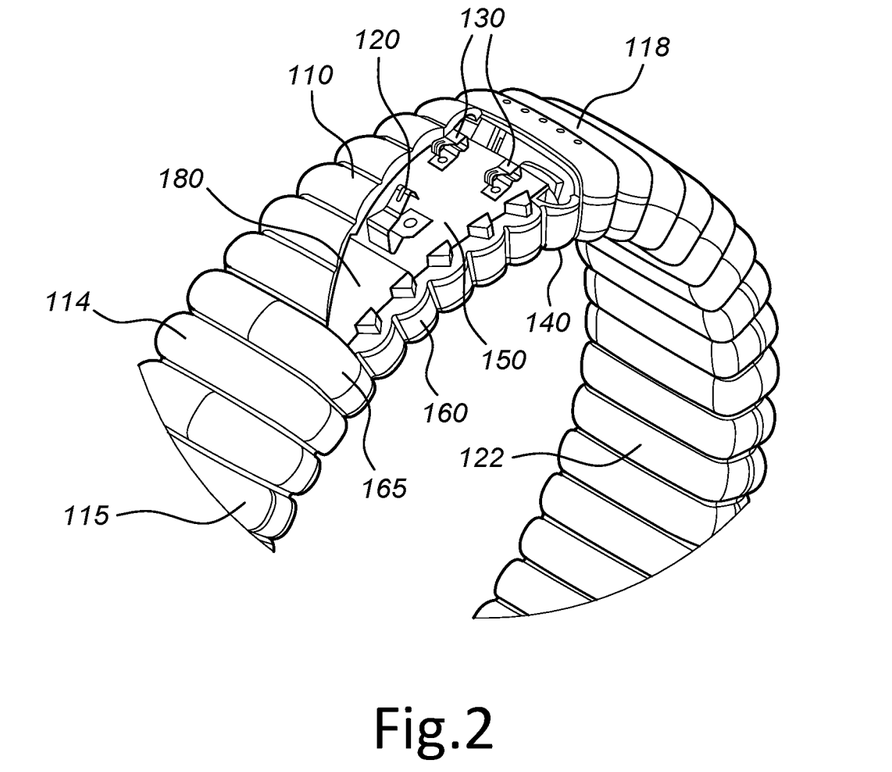
FIG. 2 illustrates a partly opened view of the smart jewellery of FIG. 1, demonstrating the antenna and its elements.

Further (as shown in FIG. 2 and following drawings), various electronic components such as a printed-circuit board (PCB) 150, wireless communication chipset, sensors and the like and other components such as springs, pins for connecting the top 118 and bottom surface 122 can be placed within the hollow core 180. The electronic components placed inside the device are configured to wirelessly receive data from other external devices, collect data through embedded sensors, process such data received, wirelessly transmit data received to other devices, and serve as a interface between the device and the user. The device is also configured to include Light-emitting diodes (LEDs), a vibro motor, hardware buttons and the like.

The patch conductor 110 which is part of the top surface 118 of the device is placed above and is connected to the ground conductor 140 and PCB 150 through a set of springs and/or other electromechanical connectors and components. The springs and PCB are placed inside the hollow core 180. The patch conductor 110 may be kept as part of the exposed top metal surface 118 of the device and the ground conductor 140, to which it is coupled, may be also kept as part of an exposed bottom metal surface 122. According to the invention, the shape of the patch conductor 110 and that of the ground conductor 140 follow and define the contours of the device, forming the shape and design of said smart jewellery device itself. This means that the design and shape of the elements of the patch antenna 110, 140 can be modified as per the desired design of the wearable device. The device further includes a dielectric (insulation) support member 160 between the top and the bottom surface 118, 122 of the device. This member 160 is adapted in such a way so as not to hinder the aesthetical appearance and performance characteristics to the device.

The depicted placement of the patch conductor 110, the ground conductor 140 and of the dielectric support member 160 is done in such a way that there is no requirement of a large metal-free clearance zone at the exposed top surface 118 or on the PCB 150. Apart from a small dielectric slit 165 between the patch conductor 110 and the remaining and opposite to the patch portion of the metallic shell parts (which are shown as metallic shell parts 114 and 115), there is no need for a dielectric zone in the exposed top metallic part of the shell of the device. The said dielectric slit 165 and respectively distance between tip of the patch 110 and the directly opposite metallic shell element 114 may be as thin as less than 2 millimetres and this further contributes to the aesthetically attractive mostly metal appearance of the device. This placement moreover saves space inside the core 180 and, hence, provides more options for placement of (smart) electronic components inside the device. As shown in FIG. 1 said slit may be designed in such a way to seamlessly integrate in the total design of the jewel as a whole.

FIG. 2 illustrates a cross-sectional view of the wearable device including the patch antenna 110,140,160 and its elements in the said device. As illustrated, the device includes a top surface 118; a bottom surface 122 and a hollow core 180 between the top and bottom surfaces 118,122. The top metallic layer 118 includes the patch conductor 110 of the patch antenna, which is a U-shaped compact microstrip patch antenna that is configured to follow and define the shape and contours of the device. This provides more freedom for the constructional/aesthetical aspects of the device.

The patch conductor 110 is connected by means of a set of springs or pins 120,130 to the ground and to the feed tracks on PCB 150 respectively. PCB 150 ground layer(s) in turn further grounded to conductor 140, formed by the bottom surface 122, with the means of springs, solder or other electromechanical connection. The patch conductor 110 acts a conducting plane and is coupled mechanically with the ground conductor 140. In particular, such coupling can be electromechanical, in which case this connector also acts as another grounding contact between patch conductor 110 and ground conductor 140.

In one embodiment the set of springs includes at least one shorting spring 130 and at least one feeder spring 120. The springs/pins 120,130 are connected to the Printed-Circuit Board (PCB) 150 which carries other electronic components to help in wireless communication. The springs/pins 120, 130 are incorporated in such a way that they can be moved for fine tuning for better wireless connectivity the antenna resonant frequency and, hence, changing the operating band. In one embodiment, the antenna is tuned properly to the required resonant frequency by repositioning the feeder 120 and shorting springs/contacts 130. In another embodiment, a matching circuitry may be incorporated for tuning the antenna. Since the patch conductor 110 is exposed to a direct contact with environment and may be prone to electrostatic discharges, the electronic circuitry 150 can be further protected by one or more transient-voltage suppressor diodes (not shown).

Figure 3A:
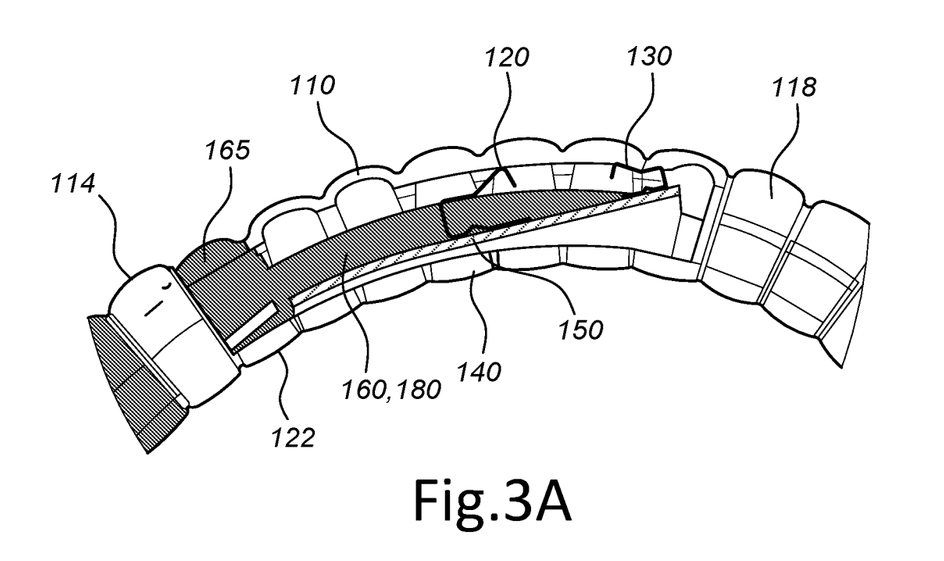
FIG. 3a illustrates a longitudinal cross-sectional view of the smart jewellery of FIG. 1, displaying the spring incorporated in the jewellery.
Figure 3B:
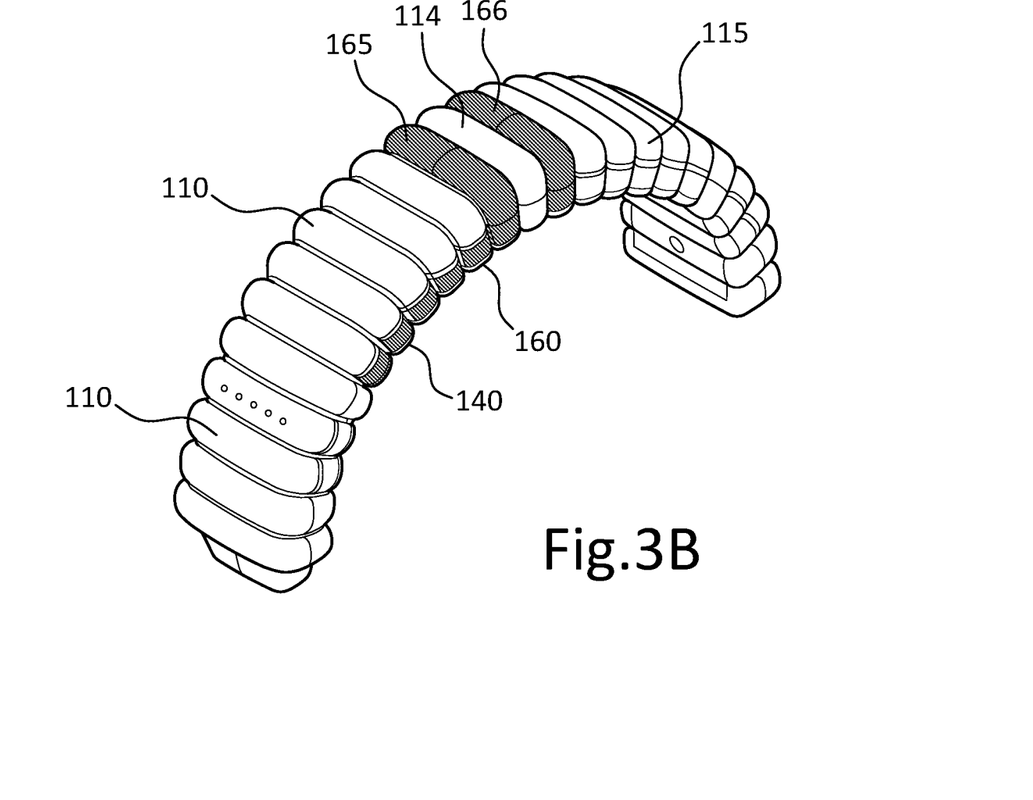
FIG. 3b illustrates the part of the smart jewellery of FIG. 1 incorporating the patch conductor and antenna.
Figure 3C:
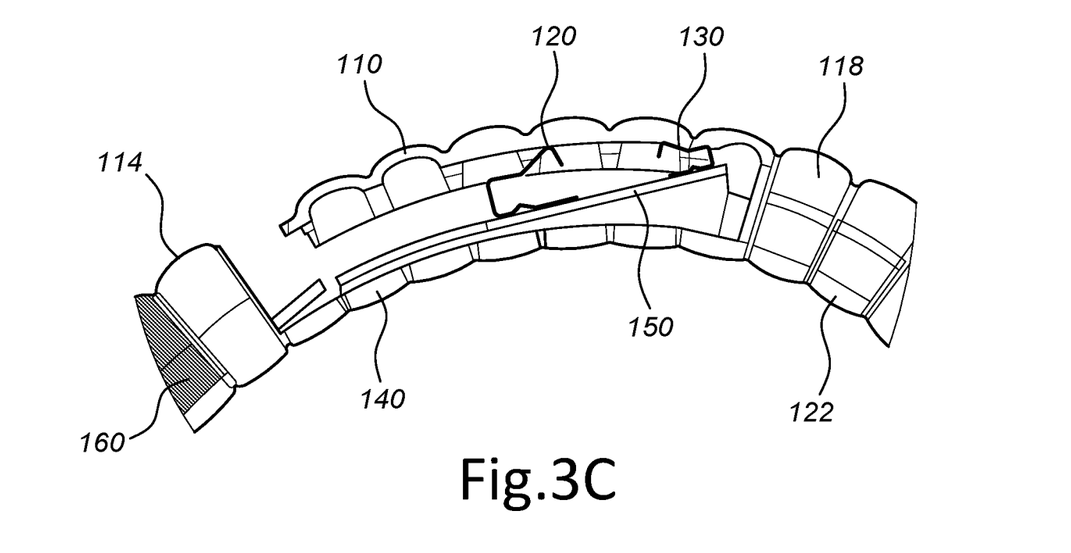
FIG. 3c illustrates a cross-sectional side view of exposed metallic patch and ground conductors of antenna and the feeder and grounding springs used in the smart jewellery for the antenna and its elements.
Figure 3D:
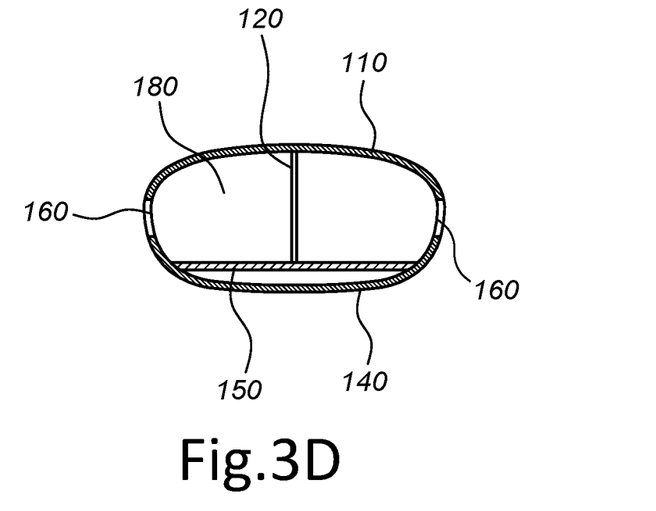
FIG. 3d shows a traverse cross-sectional view of the device of FIG. 1, demonstrating the antenna and its elements.
Figure 3E:
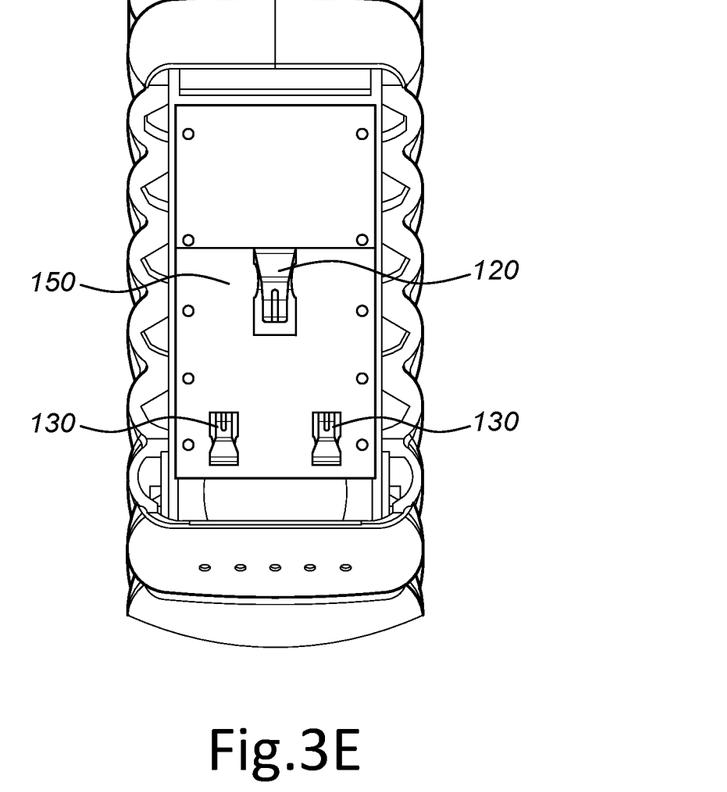
FIG. 3e illustrates an opened top view of the device of FIG. 1, including a top view of the internal PCB with communication components.

A dielectric support member 160 is placed to mechanically support and stabilize the patch conductor 110 in its desired position. The longitudinal sides of this member 160 are visible from outside the jewel and are used to separate the top patch conductor and bottom ground conductor in the antenna area and are seamlessly incorporated into the aesthetic design of the jewel. The design is optimized for bandwidth by adjusting the geometry of the patch conductor, i.e. the width, length, and the 3D shape of the top metallic surface of the device, as well as by adjusting the dimensions and shape of the dielectric support 160 that is separating top patch conductor 110 from the bottom ground 140 conductor. The dielectric member 160 also includes a rim 165 that serves as a dielectric slit between the patch conductor 110 and the remaining part of the top part of metallic shell member 114 and further on metallic part 115. As shown in FIGS. 1 and 3b, the dielectric member 160 may further include auxiliary rims such as 166 that can surface at the exposed top metal surface 115 for decorative purposes in order to complete the design.

The length of the patch conductor 110 is shorter than a quarter-wavelength in the air at the central frequency of the antenna operating band. The width of the patch conductor 110 may be as large as the width of the device and in the present example is in fact as large as allowed by the jewel size. As a result the antenna enables low losses and a wide bandwidth as permitted by the device dimensions. The patch antenna further includes a bottom planar surface 122 opposite to said top planar surface 118 to create the ground conductor 140. The bottom planar surface is connected by one or more shorting springs to the ground line on the PCB 150 that also connects to the shortening pin or spring 130 of the patch conductor 110 at a distance from the feeder (spring) 120. In between the rims of 165,166 of said dielectric support 160 there is a metallic shell member 114 which in this specific example is used to secure mechanical stability of the shell construction. This shell member 114 can be connected with the ground conductor 140 and/or with dielectric element and/or remaining part of the metallic surface of the device 115. In yet another embodiment shell member 114 can be an integral part and continuation of the remaining top metallic part 115.

For decorative purposes metal shell parts can be fitted with one or more stones, crystals or gems or ceramic or other decorative inserts to further contribute to the overall appearance of the device as a luxurious bracelet.

According to an embodiment of the present invention, the resonant frequency of the antenna, which coincides with the centre of the operating band in the GHz range, is adjusted by appropriately selecting the length of the patch conductor 110 and by positioning the grounding springs/pins 130. According to yet another embodiment of the present invention, the antenna in the device is tuned to the specific requirements of the wireless applications and the antenna is also configured to cover more than one band for the purpose of better and efficient wireless connectivity.

The patch antenna can be made up of various materials by various manufacturing techniques. For example, the patch conductor may be coated using electroplated coating and other types of metal-on-metal coating, or several other coatings using brass, gold silver or some non-metal and the like.

According to still another embodiment of the present invention, some parts of the patch antenna and remaining parts of the device may be covered with a dielectric material and may also include dielectric coatings for aesthetical purposes and the insulating material used can also be a dielectric material. The dielectric material can be plastic, ceramics or other type of dielectric material. It can be produced by various techniques and may include coatings to obtain the necessary look and feel of the surface. Particularly, the metal parts that define the outer surfaces of the device, including the patch conductor, can be partially covered by non-metal material or can have non-metal inserts in the metallic surfaces to improve the mechanical stability or for aesthetic purposes.

The electromagnetic effect of the dielectric member 160 may reduce the wavelength on the transmission line depending on its material and dimensions, and also the size and material of dielectric slit 165 separating the tip of the patch 110 from the remaining part of top metallic surface may reduce resonant frequency, so that the patch part can be further reduced in size, while behaving as if it is electrically longer.

According to still another embodiment of the invention, the design of the device can be optimized for bandwidth by adjusting the geometry of the patch on the top surface of the wearable device, i.e., its width, length, and the 3D shape, as well as by adjusting the dimensions and shape of the dielectric support that is separating the top patch from the bottom ground (both are parts of the jewel's metal embodiment). The dimensions of the patch can be estimated using a computational model. However, due to the high complexity of the 3D shape of the jewel, the design is completed by experimental tuning. There is a multitude of possible variations of the design and dimensions, while the core principle of antenna operation and design described herein remains the same.

In still another embodiment of the invention, the patch antenna can be placed on any part of the top surface of the wearable device for example, in a bracelet, from the centre towards one side of the bracelet. Thus, in variants of this design, the resulting antenna construction can be longer, shorter, narrower, wider and placed in the centre or moved anywhere along the top surface of the device. Also, the shape of the surface can be altered. The patch conductor, and hence the patch antenna, ends at the location of the dielectric slit 165 that is provided for that purpose. Depending on the 3-D pattern of the top surface of the wearable device, the patch antenna can be of different shapes including but not limited to the following:

a) The patch conductor 110 can be flat or have more curved edges on the sides forming the inverted U-shape to enhance the aesthetics of the smart jewel.
b) The patch conductor 110 can be flat or have a variety of 3D shapes, segments/waves/other 3D shapes of the top surface of the wearable device.
c) The height of the patch conductor 110 with respect to the ground conductor 140 can be adjusted to balance the design in respect to its performance i.e. it can be lower or higher than in the current design and can have different height with respect to the ground conductor at the tip and at other parts. In case where a PCB 150 is used as a ground conductor itself, the height can be also varied with the relative position of PCB with respect to the patch.
d) Some parts of the patch conductor can also be covered with a dielectric material/insulating for decorative purposes (e.g., plastic, glass, stone, enamel, ceramics, etc.). The insulating part can also have possible variations and consists primarily of two areas:
  i. The area between the patch conductor and the ground conductor.
  ii. The area at the tip of the patch conductor, towards the rest of the metallic body shell of the jewel.

FIG. 3a-FIG. 3d illustrate various cross-sectional views of the device exemplifying the antenna and its various components including springs/pins, PCB, placement of various electronic components inside the hollow portion of the device.

Figure 4:
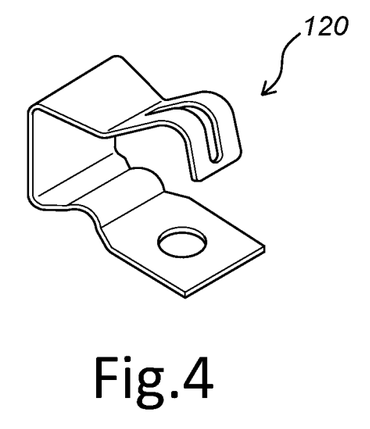
FIG. 4 illustrates a spring according to an embodiment of the present invention.

FIG. 4 illustrates a one of the possible options of spring/pin connector and a model of such spring/pin connector, respectively used for connecting the patch to the electronic components inside the device according to an embodiment of the present invention.

Such type of patch antenna as described in the invention follows the jewellery design and has low losses and a relatively wide bandwidth because the dimensions of the antenna are properly designed. The resonant frequency of the antenna (which coincides with the centre of the operating band and is in the GHz range) is adjusted by appropriately selecting the length of the patch conductor and by positioning the grounding springs (pins). The particular antenna in the bracelet is tuned to the specific requirements of Bluetooth applications. If required (e.g., for WLAN applications), the antenna can be redesigned to cover more than one, particularly two, bands. The multiband operation can be achieved for example by cutting appropriate grooves in the patch and/or by adapting the feeding network.

Further, such configuration of the patch antenna in the wearable device as described in invention gives the possibility to maximize the metal surface of the jewel, which offers much more freedom for the design (the aesthetic benefit) and also helps to reduce the overall height of the wearable, while maintaining the acceptable antenna performance. Since the outer surfaces are used as the patch conductor and the ground, with the same internal height between the patch conductor and the ground required for a sufficient antenna performance, the overall height of the wearable is lower, which improves aesthetics and wearability of the jewel.

From a manufacturing point of view, the advantage is that once the outer shape and dimensions are fixed for one design, other variants of metal and plastic materials and colours can be used without changing the production (or just with a minor adjustment). The patch antenna may be tuned by repositioning the springs/pins inside, thus allowing a greater design variance with relatively minor adjustments of the PCBs inside. The features of the present invention allow for tuning the antenna in the prototyping phase, as well as in the mass production, if needed due to the variations of the shape of the jewellery or the materials used.

Although the invention has been explained in relation to its preferred embodiment(s) as mentioned above, it is to be understood that many other possible modifications and variations can be made without departing from the scope of the present invention. It is, therefore, contemplated that the appended claims will cover such modifications and variations that fall within the true scope of the invention. Besides communication means, the structure and the PCB may contain additional electronic components, like for instance a heart rate and/or temperature sensor integrated in the bottom surface of the device.

The invention claimed is:

1. A wearable device, comprising a structure that is configured to be worn by a user, said structure having a first exposed surface and a second exposed surface, said second surface being located closer to the user than said first surface when the structure is being worn by the user, said structure comprising wireless communication means and comprising a patch antenna that is coupled to said wireless communication means to receive and/or transmit electromagnetic radiation, wherein said patch antenna comprises a substantially planar patch conductor and a substantially planar ground conductor that are separated by a dielectric in between said patch conductor and said ground conductor while at least partially overlapping with one another laterally, and wherein said structure comprises a core within a shell, said core comprising at least part of said communication means wherein said shell comprises a first shell part that defines a first circumference of the device and comprises said first surface, wherein said shell comprises a second shell part that defines a second circumference of the device and comprises said second surface, wherein said first shell part and said second shell part are formed at least substantially of metal and are at least partially separated from one another by said dielectric, wherein said first shell part forms said patch conductor at said first exposed surface, wherein said second shell part forms said ground conductor at said second exposed surface, and wherein said first shell part and said second shell part together form said patch antenna, wherein at least one shortening spring is connected to a printed circuit board (PCB) acting as a ground layer, which in turn is connected to the second metal shell part of the device, acting as a ground conductor.

2. A wearable device as claimed in claim 1, wherein said first shell part comprises an exposed top surface of said device and said second shell part comprises a bottom surface of said device at a side that is opposite to said top surface.

3. A wearable device as claimed in claim 1, wherein a length of said patch conductor is shorter than a quarter-wavelength at a central frequency of an operating band of said antenna.

4. A wearable device as claimed in claim 1, wherein a width of said patch conductor is substantially equal to a width of said wearable device.

5. A wearable device as claimed in claim 1, wherein said communication means comprise at least one feeder spring inside said core that is configured to connect said patch conductor to said communication means.

6. A wearable device as claimed in claim 5, wherein said core comprises at least one shortening spring that is configured to connect said patch conductor to said ground conductor, and wherein at least one of said at least one feeder spring and at least one shorting spring is adjustable, particularly displaceable, for fine tuning of said patch antenna.

7. A wearable device as claimed in claim 6, wherein a resonant frequency of said patch antenna is determined by a length of said patch conductor and a position of said at least one feeder spring and of said at least one shorting spring.

8. A wearable device as claimed in claim 7, wherein said patch antenna is configured to cover more than one frequency band.

9. A wearable device as claimed in claim 1, wherein said patch conductor and said ground conductor are shaped according to the respective contour of said structure.

10. A wearable device as claimed in claim 1, wherein said dielectric is part of a dielectric member, said dielectric member having a first portion that lies in between the first metal shell part, and wherein the second metal shell part and having a second portion that emerges laterally adjacent to a tip end of the patch conductor at an exposed surface of the first shell part.

11. A wearable device as claimed in claim 1, wherein said first and said second shell part constitute said patch conductor and said ground conductor respectively and are each made out of at least one metal.

12. A wearable device as claimed in claim 11, wherein said metal is a precious metal.

13. A wearable device as claimed in claim 12, wherein said precious metal is a noble metal.

14. A wearable device as claimed in claim 12, wherein said human recognizable indicator means, comprise one or more light emitting diodes (LEDs).

15. A wearable device as claimed in claim 12, wherein said human recognizable indicator means, comprise vibrating means.

16. A wearable device as claimed in claim 1, wherein said first shell part constitutes said patch conductor and said second shell part constitutes said ground conductor.

17. A wearable device as claimed in claim 1, wherein said patch conductor is coated with an insulating material.

18. A wearable device as claimed in claim 1, wherein said shell features one or more human recognizable indicator means.

19. A wearable device as claimed in claim 1, wherein said patch antenna is tuned by an electronic circuitry arrangement.

20. A wearable device as claimed in claim 1, wherein at least said first shell part is set with at least one jewel from a group containing crystals, semi-precious stones and gemstones.

* * * * *